No. 733,731. PATENTED JULY 14, 1903.
W. MOONEY & O. JAEGER.
SEAL FOR PIPE COUPLINGS AND NUTS.
APPLICATION FILED DEC. 2, 1902.
NO MODEL.
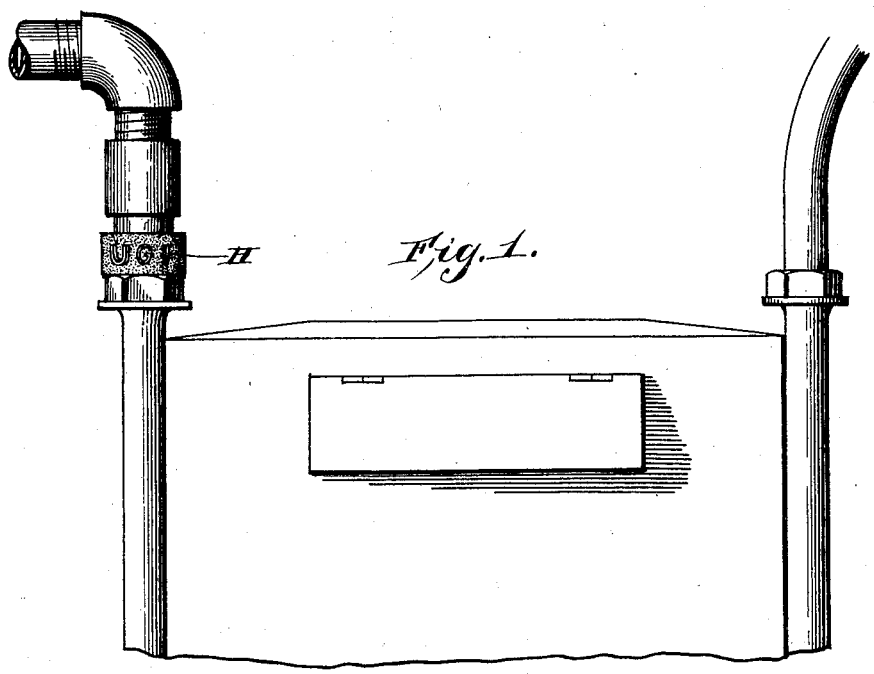
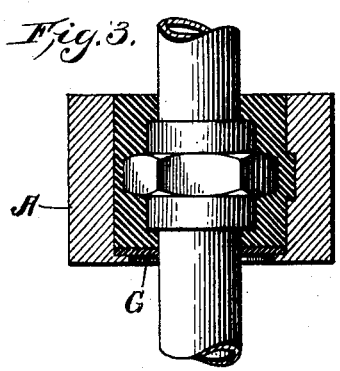
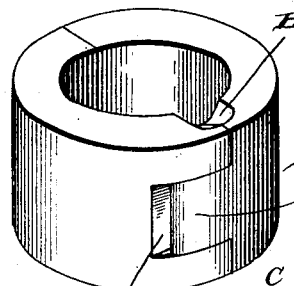
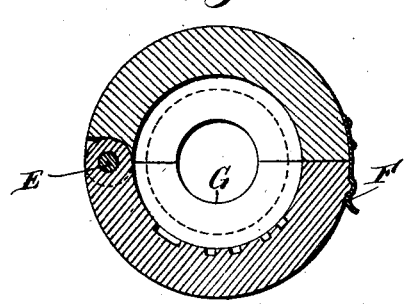
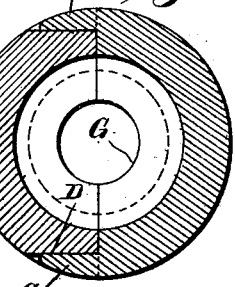
Witnesses:
Louis D. Heinrichs
L. H. Morrison
Inventors
William Mooney
Otto Jaeger
By their Atty
THE NORRIS PETERS CO., PHOTO-LITHO., WASHINGTON, D. C.

No. 733,731. Patented July 14, 1903.

UNITED STATES PATENT OFFICE.

WILLIAM MOONEY AND OTTO JAEGER, OF PHILADELPHIA, PENNSYLVANIA.

SEAL FOR PIPE-COUPLINGS AND NUTS.

SPECIFICATION forming part of Letters Patent No. 733,731, dated July 14, 1903.

Application filed December 2, 1902. Serial No. 133,632. (No model.)

*To all whom it may concern:*

Be it known that we, WILLIAM MOONEY and OTTO JAEGER, citizens of the United States, residing at Philadelphia, county of Philadelphia, and State of Pennsylvania, have invented a certain new and useful Improvement in Seals for Pipe-Couplings and Nuts, of which the following is a specification.

Our invention relates to a new and useful improvement in seals for pipe-joints, and has for its object to provide mechanism whereby a pipe-joint may be surrounded with a substance which must necessarily be broken before the pipe can be unjointed.

With this end in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a front view of the upper portion of a meter, showing our improved seal applied thereto; Fig. 2, a perspective view of the mold for forming the seal; Fig. 3, a vertical section through a mold and seal, in which the seal is shown surrounding a nut or union-coupling; Fig. 4, a cross-section through the mold shown in Fig. 3; Fig. 5, a cross-section showing a modified form of mold.

At times it is a great advantage to be able to seal a pipe-joint which will give an indication that the same has been tampered with by unauthorized persons—as, for instance, in gas-meters. It has been ascertained that some consumers will detach both sides of the meter from the pipes and connect the same together with a rubber tube above the meter, thus using the gas without the same being registered by the meter. In such cases if the company's side of the meter is protected by a seal the same could not be disconnected without indicating that the same had been tampered with and the seal could be used advantageously in all pipe-joints or even rod-couplings where it is desirable to know if the coupling has been disconnected at any time by unauthorized persons.

A represents a mold which is made in the form of a longitudinal divided cylinder, and the two halves of the cylinder or mold are placed around the pipe or coupling, so that the two halves will meet, and then sealing-wax, paraffin, plaster-of-paris, lead, or any other suitable material which will harden by cooling or evaporation is poured or plastered in the mold surrounding the pipe or coupling, and then when this material is hardened the same is removed by separating the two halves, which will leave a ring of the hardened material surrounding the pipe or coupling. Thus the coupling cannot be unjointed without breaking the seal thus formed. The upper edge of the two halves of the mold A is provided with a cut-away portion B, in which the material may be poured, and the two halves of the mold may be held in alinement with one another in any suitable manner, the form shown in Fig. 2 consisting in forming tongues C with one half of the mold which fit in grooves D, provided in the other half upon each side, as shown in Fig. 4; but if desired the two halves of the mold may be hinged together at the point E, as shown in Fig. 5, and when brought together they may be held by means of a spring-latch F; but of course we do not wish to be limited to any form of holding the two halves of the mold in alinement or together, as the gist of our invention consists in providing a divided mold which may surround any pipe or coupling. To prevent the material from which the seal is formed from flowing through the mold, we provide upon the lower edge of the same a divided washer G, which washer is adapted to hug the pipe or coupling, so as to prevent any of the material from flowing through; but of course where the lower portion of the mold comes in contact with a flat surface or flange this washer can be dispensed with. Upon the inside of the mold suitable letters, designs, or other representations could be formed either in raised or sunken characters, so that the seal when formed would bear an imprint of such representations, as shown at H in Fig. 1.

Of course we do not wish to be limited to the exact construction here shown, as slight modifications could be made without departing from the spirit of our invention.

Having thus fully described our invention, what we claim is new and useful is—

1. The combination of two pipes, rods or the like coupled together with nuts or other couplings with a ring of sealing-wax, paraffin, plaster-of-paris, lead or like material molded around the nut or other coupling so that the coupling cannot be moved without first breaking the seal, and characters either raised or sunken below the surface of said seal, as specified.

2. In combination with two pipes, rods or the like coupled together with nuts or other couplings with a ring of material adapted to be molded around the couplings so as to entirely conceal the same, as specified.

3. The combination of two pipes or rods coupled together with a nut or other coupling, with a ring of sealing-wax, paraffin, plaster-of-paris, lead or the like molded around the pipes or rods so that the coupling cannot be moved without breaking the seal, and means molded with the seal for identifying the same, as specified.

In testimony whereof we have hereunto affixed our signatures in the presence of two subscribing witnesses.

WILLIAM MOONEY.
OTTO JAEGER.

Witnesses:
AUGUST JAEGER, Sr.,
FRANK MORRIS.